United States Patent
Lin et al.

(10) Patent No.: US 8,774,276 B2
(45) Date of Patent: Jul. 8, 2014

(54) IMAGE PROCESSING METHOD FOR DETERMINING MOTION VECTORS OF INTERPOLATED PICTURE AND RELATED APPARATUS

(75) Inventors: Yu-Sen Lin, Tai-Chung (TW); Te-Wei Hsu, Taichung County (TW); Chung-Yi Chen, Nantou County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 483 days.

(21) Appl. No.: 12/468,855

(22) Filed: May 19, 2009

(65) Prior Publication Data

US 2010/0149421 A1    Jun. 17, 2010

(30) Foreign Application Priority Data

Dec. 12, 2008  (TW) ................................ 97148503 A (51) Int. Cl.
- *H04N 19/00* (2014.01)
- *H04N 7/26* (2006.01)
- *H04N 11/02* (2006.01)
- *H04N 11/04* (2006.01)
- *H04N 5/14* (2006.01)
- *H04N 9/64* (2006.01)

(52) U.S. Cl.
CPC ...................... *H04N 19/00* (2013.01)
USPC .................. 375/240.16; 375/240.24; 348/699

(58) Field of Classification Search
None
See application file for complete search history.

(56) References Cited

U.S. PATENT DOCUMENTS

| | | | |
|---|---|---|---|
| 5,457,481 A | 10/1995 | Sohn | |
| 2007/0133684 A1* | 6/2007 | Ikegami | 375/240.16 |
| 2007/0140346 A1* | 6/2007 | Chen et al. | 375/240.16 |
| 2007/0147506 A1* | 6/2007 | Kwon et al. | 375/240.16 |
| 2008/0130752 A1* | 6/2008 | Hamakawa et al. | 375/240.16 |
| 2008/0137747 A1* | 6/2008 | Yamasaki et al. | 375/240.16 |
| 2009/0074311 A1* | 3/2009 | Lee | 382/236 |
| 2009/0208123 A1* | 8/2009 | Doswald | 382/236 |
| 2009/0244388 A1* | 10/2009 | Lin et al. | 348/699 |
| 2009/0278991 A1* | 11/2009 | Freiburg et al. | 348/699 |

* cited by examiner

*Primary Examiner* — Joseph Ustaris
*Assistant Examiner* — Edemio Navas, Jr.
(74) *Attorney, Agent, or Firm* — Winston Hsu; Scott Margo (57) ABSTRACT

An image processing method for determining a motion vector of an interpolated block in a covered/uncovered area of an interpolated picture. The method comprises determining image difference values of successive blocks according to original motion vectors of the successive blocks; determining first and second motion vectors for the successive blocks according to the image difference values, wherein the first and the second motion vector of one of the successive blocks are the original motion vectors of two blocks located in both side of a block having a maximum image difference value; determining a starting point of the interpolated block according to the first and the second motion vectors of the successive blocks; and selecting one of the first and the second motion vectors of the interpolated block as the motion vector of the interpolated block according to the starting point and a starting point in a previous interpolated picture.

10 Claims, 10 Drawing Sheets

| $MV_{-22}$ | $MV_{-12}$ | $MV_{-02}$ | $MV_{12}$ | $MV_{22}$ |
|---|---|---|---|---|
| $MV_{-21}$ | $MV_{-11}$ | $MV_{01}$ | $MV_{11}$ | $MV_{21}$ |
| $MV_{-20}$ | $MV_{-10}$ | $MV_{00}$ | $MV_{10}$ | $MV_{20}$ |
| $MV_{-2-1}$ | $MV_{-1-1}$ | $MV_{0-1}$ | $MV_{1-1}$ | $MV_{2-1}$ |
| $MV_{-2-2}$ | $MV_{-1-2}$ | $MV_{0-2}$ | $MV_{1-2}$ | $MV_{2-2}$ |

IMAGE PROCESSING METHOD FOR DETERMINING MOTION VECTORS OF INTERPOLATED PICTURE AND RELATED APPARATUS

BACKGROUND OF THE INVENTION

1. Field of the Invention

The present invention relates to an image processing mechanism, and more particularly, to an image processing method for determining a motion vector of an interpolated block, and a related apparatus.

2. Description of the Prior Art

Figure 1:
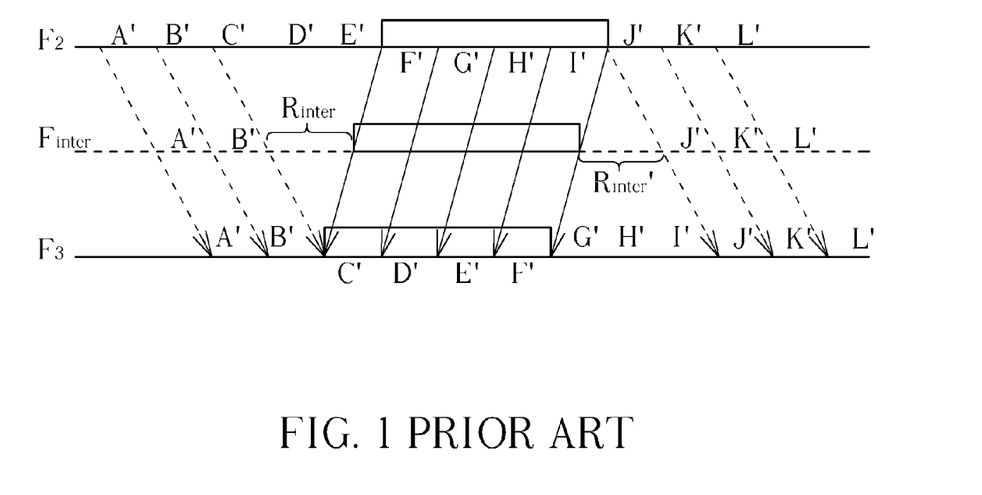
FIG. 1 is a diagram illustrating operation of a conventional block matching algorithm.

In a conventional image interpolation mechanism, a motion vector of an interpolated block in an interpolated picture is directly determined according to a calculated result of a block matching algorithm and thereby an image of the interpolated block is generated according to the motion vector. Please refer to FIG. 1. FIG. 1 is a diagram illustrating an operation of the conventional block matching algorithm. As shown in FIG. 1, image pictures $F_2$, $F_3$ are sequential pictures of input images, an image picture $F_{inter}$ is an interpolated picture generated from the conventional image interpolation mechanism and A'~L' are background images of image pictures $F_2$, $F_3$, where each dotted-line arrow indicates a moving direction of a background image and each solid-line arrow indicates a moving direction of a foreground object. Background images F'~I' of the image picture $F_2$ are covered by the foreground object whereas in the next image picture $F_3$, background images C'~F' are covered by the foreground object. Since the block matching algorithm is capable of finding background images A', B', J', K', L' within sequential image pictures F2, F3, a target motion vector of a corresponding block can be determined correctly and background images A' B', J', K', L' can be displayed in the image picture $F_{inter}$ (as illustrated in FIG. 1). In addition, the block matching algorithm is also capable of finding an image of the foreground object within sequential image pictures F2, F3, therefore a target motion vector of a corresponding block can be determined correctly and an image of the foreground object can be displayed in image picture $F_{inter}$.

When determining target motion vectors of interpolated blocks within regions $R_{inter}$ and $R_{inter}'$, background images within regions $R_{inter}$ and $R_{inter}'$, should, ideally, be able to be displayed since the target motion vectors of regions $R_{inter}$ and $R_{inter}'$ are background motion vectors. For example, background images C' and D' ideally should be displayed in region $R_{inter}$ while background images H' and I' should be displayed in region $R_{inter}'$. In fact, since the block matching algorithm cannot find background images C', D' (covered by a foreground object) in image picture $F_3$ and, likewise, cannot find images H', I' (covered by a foreground object) in image picture $F_2$, the block matching algorithm fails to determine motion vectors as normal, leading to an image distortion in the interpolated regions $R_{inter}$ and $R_{inter}'$. When applied to a frame rate conversion, the conventional image interpolation mechanism degrades quality of output images by a significant amount.

SUMMARY OF THE INVENTION

One objective of the present invention is therefore to provide an image processing method capable of determining motion vectors of interpolated blocks correctly, and a related apparatus, to solve the aforementioned problems.

According to an embodiment of the present invention, an image processing method is disclosed. The image processing method for determining a motion vector of a interpolated block in a covered/uncovered area of an interpolated picture, the interpolated picture being composed of a plurality of blocks, the image processing method comprises determining a plurality of image difference values of a plurality of successive blocks along one dimension according to original motion vectors of the successive blocks, wherein the successive blocks include the interpolated block; determining first motion vectors and second motion vectors for the successive blocks according to the image difference values of the successive blocks, wherein the first motion vector and the second motion vector of one of the successive blocks are the original motion vectors of two blocks located in both side of a block having a maximum image difference value; determining a starting point of the interpolated block according to the first motion vectors and the second motion vectors of the successive blocks; and selecting one of the first motion vector and the second motion vector of the interpolated block as the motion vector of the interpolated block according to the starting point and a starting point in a previous interpolated picture.

In addition, according to another embodiment of the present invention, an image processing method is disclosed. The image processing method for determining a motion vector of a interpolated block in a covered/uncovered area of an interpolated picture when an image interpolation is performed, the interpolated picture being composed of a plurality of blocks, the image processing method comprises determining first candidate vectors and second candidate vectors for a successive blocks within the interpolated picture and first candidate vectors and second candidate vectors for a corresponding successive blocks within a previous interpolated picture, respectively, wherein the successive blocks include the interpolated block; utilizing one of the first candidate vectors and the second candidate vectors of the interpolated picture and the previous interpolated picture to determine a starting position of the covered/uncovered areas within the interpolated picture and a corresponding starting position of a covered/uncovered area within the previous interpolated picture, respectively; and determining one of the first candidate vector and the second candidate vector of the interpolated block as a motion vector of the interpolated block according to the starting position of the interpolated picture and the starting position of the previous interpolated picture.

According to yet another embodiment of the present invention, an image processing apparatus is disclosed. The image processing apparatus for determining a motion vector of a interpolated block in a covered/uncovered area of an interpolated picture when an image interpolation is performed, the interpolated picture being composed of a plurality of blocks, the image processing apparatus comprises a storage unit, for storing at least a previous original picture and a next original picture of the interpolated picture and a starting position of a previous interpolated picture and a calculating unit, coupled to the storage unit. And the calculating unit comprises a candidate vector generating module, for determining a plurality of first candidate vectors and a plurality of second candidate vectors for a successive blocks in the interpolated picture and a motion vector determining module, for determining a motion vector of the interpolated block according to the first candidate vectors and the second candidate vectors of the successive blocks in the interpolated picture and the starting position of the previous interpolated picture.

The advantage of the present invention is that, for a block within a covered area or uncovered area, the aforementioned method and apparatus are capable of deriving a target motion vector of the block correctly and therefore can acquire a better image when performing image interpolation according to the motion vector. In this way, the image quality of the frame rate conversion result is improved greatly.

These and other objectives of the present invention will no doubt become obvious to those of ordinary skill in the art after reading the following detailed description of the preferred embodiment that is illustrated in the various figures and drawings.

DETAILED DESCRIPTION

For ease of reading, the following describes those background image areas which are not blocked by a foreground object in a previous picture but blocked by a foreground object in a next picture as covered areas, whereas those background image areas which are blocked by a foreground object in a previous picture but not blocked by a foreground object in a next picture as uncovered areas; for example, the background image areas C', D', E' shown in FIG. 1 are covered areas while the background image areas G', H', I' are uncovered areas; it should be noted that the definitions described above are only for ease of explanation, and are not meant to limit the present invention.

Figure 2:
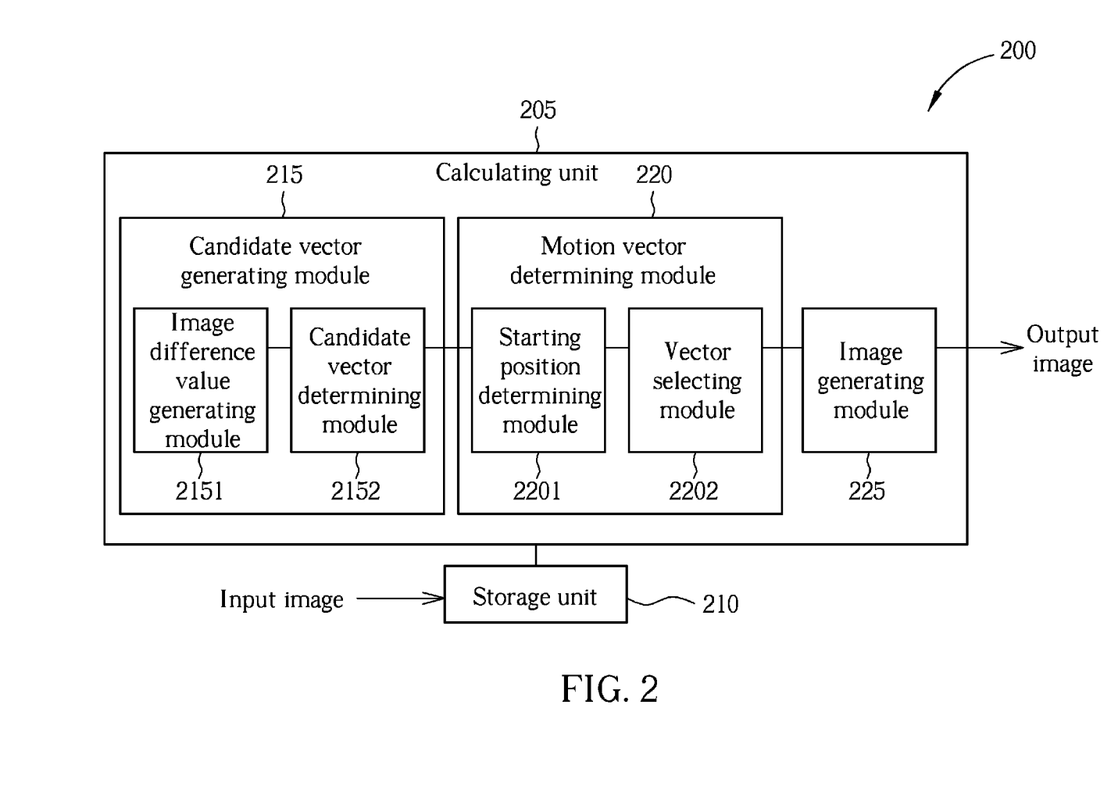
FIG. 2 is a block diagram of a first embodiment of an image processing apparatus according to the present invention.
Figure 3A:
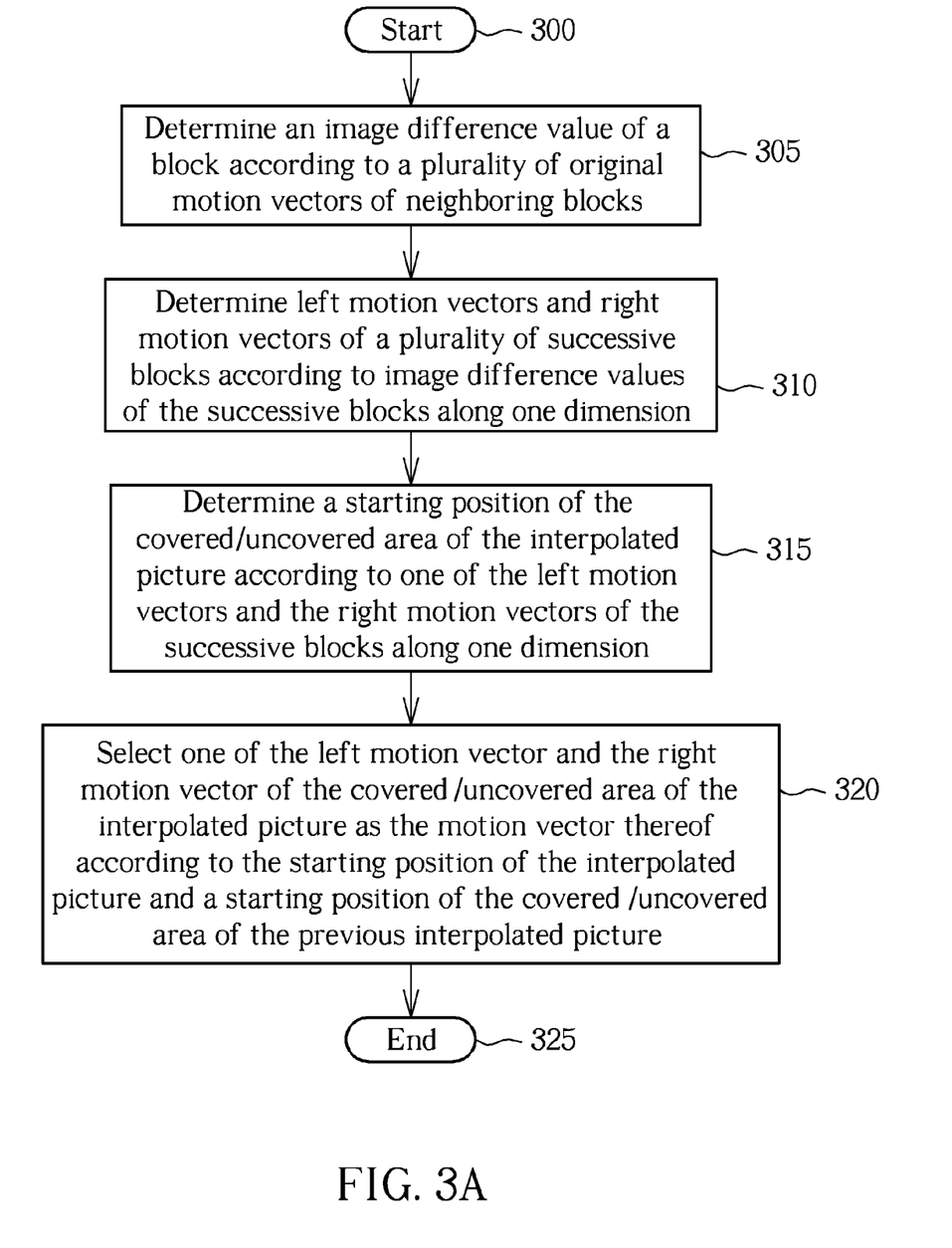
FIG. 3A is a flowchart of the operation of the image processing apparatus shown in FIG. 2.

Please refer to FIG. 2 and FIG. 3A. FIG. 2 illustrates an image processing apparatus 200 according to a first embodiment of the present invention, and FIG. 3A illustrates a flowchart of operation of the image processing apparatus 200 shown in FIG. 2. For ease of explanation, the following describes the operation of the image processing apparatus 200 in FIG. 2 along with steps shown in FIG. 3. It should be noted that the order of steps in FIG. 3A is not necessarily fixed if the same result can be substantially attained. Additionally, all the steps in FIG. 3A are not required to be executed continuously, i.e., other steps can be inserted in between the steps in FIG. 3A. As shown in FIG. 2, the image processing unit 200 comprises a calculating unit 205 and a storage unit 210. The image processing apparatus 200 is for determining at least a motion vector of covered/uncovered areas of an interpolated picture composed of a plurality of blocks when a picture interpolation is performed upon moving pictures. The storage unit 210 is for storing at least a previous original picture and a next original picture of an interpolated picture, and a starting position/point of a covered/uncovered area of a previous interpolated picture of the interpolated picture. The calculation unit 205 is coupled to the storage unit 210, and comprises a candidate vector generating module 215, a motion vector determining module 220 and an image generating module 225. The candidate vector generating module 215 is for determining a plurality of first candidate vectors (also called left motion vectors) of a plurality of blocks in the interpolated picture and a plurality of second candidate vectors (also called right motion vectors) of a plurality of blocks in the interpolated picture. The motion vector determining module 220 is for determining a motion vector corresponding to each block within covered/uncovered areas of the interpolated picture according to the left motion vectors, the right motion vectors and the starting position of the previous interpolated picture. The image generating module 225 is for generating an image of each block within covered/uncovered areas of the interpolated picture according to motion vectors determined by the motion vector determining module 220.

In detail, the candidate vector generating module 215 further comprises an image difference value generating module 2151 and a candidate vector determining module 2152. The image difference value generating module 2151 determines an image difference value of a block according to a plurality of original motion vectors of neighboring blocks (step 305), and the candidate vector determining module 2152 determines left motion vectors and right motion vectors of a plurality of successive blocks according to image difference values of the successive blocks along one dimension (step 310). In addition, the motion vector determining module 220 comprises a starting position determining module 2201 and a vector selecting module 2202. The starting position determining module 2201 calculates a plurality of block matching difference values corresponding to the blocks according to one of the left motion vectors and the right motion vectors of the blocks of the interpolated picture, and thereby determines a starting position of the interpolated picture according to a variation of the block matching difference values (step 315). The vector selecting module 2202 generates a reference vector according to the starting position of the interpolated picture and the starting position of the previous interpolated picture, and compares the left motion vector and the right motion vector corresponding to each block in covered/uncovered areas of the interpolated picture with the reference vector to determine which (the left motion vector or the right motion vector) is less relevant to the reference vector, and then selects the less relevant vector as a motion vector of each block (step 320).

Please note that the original motion vector in the first embodiment is derived by performing block matching between a previous original picture and a next original picture, and in the step of determining the starting position of the interpolated picture (i.e., step 315), the block matching difference values corresponding to the blocks are derived from either the left motion vectors or the right motion vectors of the blocks, thereby the starting position can be determined by a variation of the block matching difference values corresponding to the blocks. The operation will be detailed later. It is worth noting that, in the first embodiment, the image processing apparatus 200 does not determine the starting position of the covered/uncovered areas of the previous interpolated picture. In other words, assuming the condition of knowing the starting position of the covered/uncovered areas of the previous interpolated picture, only the starting position of the current interpolated picture is calculated, and calculating the starting position of the previous interpolated picture is not necessary.

Figure 3B:
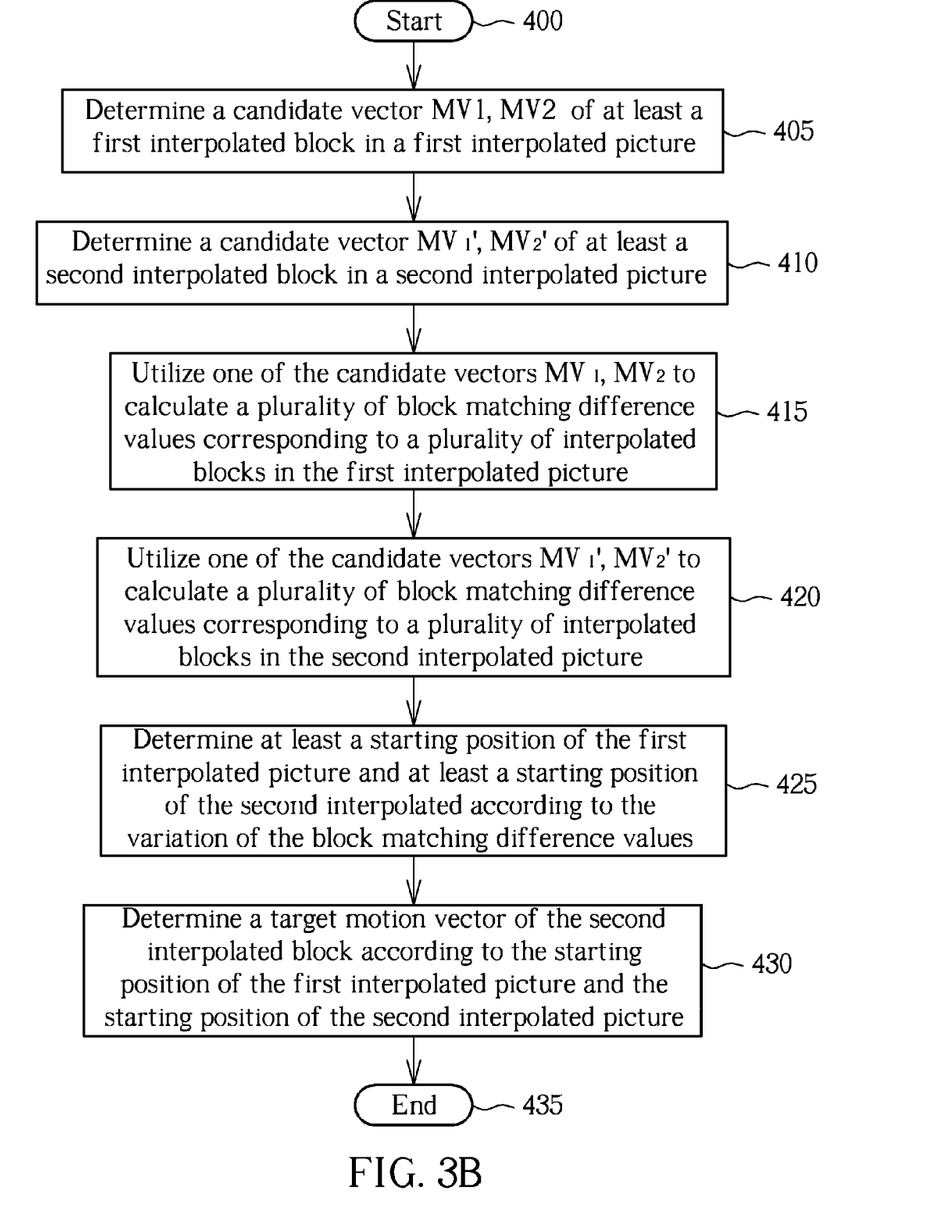
FIG. 3B is a flowchart of the operation of a second embodiment of the image processing apparatus shown in FIG. 2.
Figure 4:
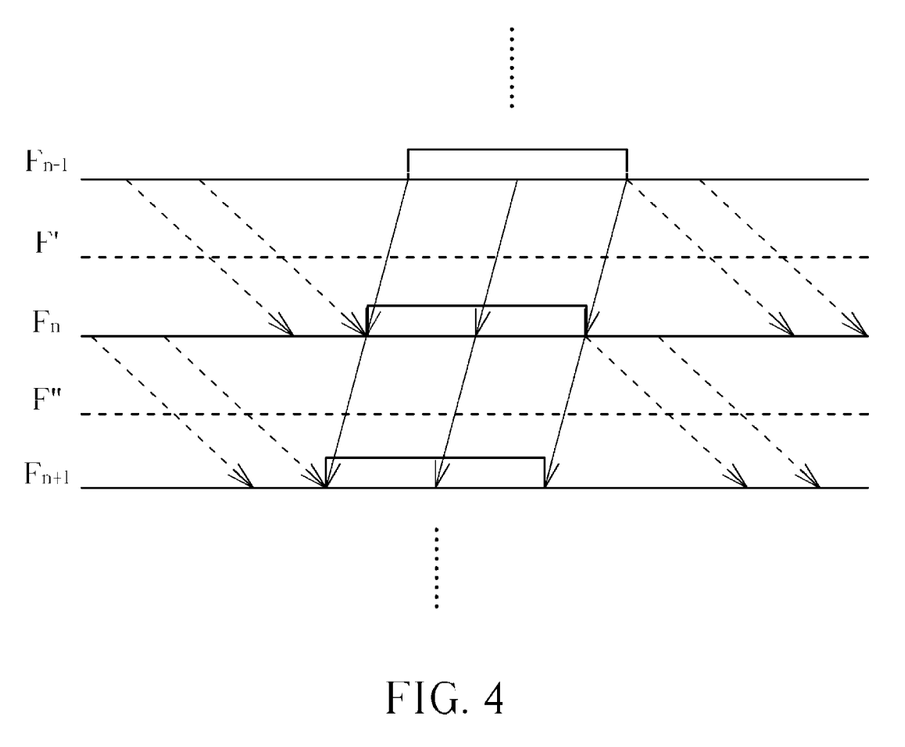
FIG. 4 is a diagram of an output image generated by a calculating unit shown in FIG. 2 which performs a frame rate conversion.

In addition, a second embodiment of the present invention, is illustrated by FIG. 2 along with the flowchart in FIG. 3B, where the candidate vector generating module 215 is also designed to determine a candidate vector $MV_1$, $MV_2$ (called left motion vector, right motion vector, respectively) of at least a first interpolated block in a first interpolated picture (step 405) and determine a candidate vector $MV_1'$, $MV_2'$ of at least a second interpolated block in a second interpolated picture (step 410). In a practical implementation of this embodiment, the candidate vector generating module 215 generates two candidate vectors corresponding to each interpolated block of the first and second interpolated pictures, and each block contains, for example, an 8×8 pixel range; furthermore, the motion vector determining module 220 is designed for utilizing a candidate vector (e.g., $MV_1$) of the first interpolated block and a candidate vector (e.g., $MV_1'$) of the second interpolated block to calculate a plurality of block matching difference values corresponding to a plurality of interpolated blocks in the first and second interpolated pictures (step 415 and step 420), storing the block matching difference values into the storage unit 210, and then determining at least a starting position of the first interpolated picture and at least a starting position of the second interpolated according to the variation of the block matching difference values described previously (step 425), wherein the two starting positions are edges of a covered area or an uncovered area. The motion vector determining module 220 determines a target motion vector of the second interpolated block according to the starting position of the first interpolated picture and the starting position of the second interpolated picture (step 430), wherein there exists at least one non-interpolated picture between the first and the second interpolated pictures, i.e., the first interpolated picture can be generated from a previous picture immediately before the second interpolated picture. For an illustration of this, please refer to FIG. 4, which illustrates that the calculating unit 205 shown in FIG. 2 performs frame rate conversion for multiple input images (frame or field, only $F_{n-1}$, $F_n$, $F_{n+1}$ are illustrated here) to generate multiple output images. For example, frames $F_{n-1}$, $F_n$, $F_{n+1}$ are input frames at 60 Hz, and the calculating unit 205 performs frame rate conversion for those input frames to generates frames at 120 Hz, where 60 Hz and 120 Hz are for illustrative purposes only, and are not limitations to this invention. The following operation utilizes the second embodiment as an example for explanation; however, the operation can also be applied to the first embodiment, and the description thereof is abbreviated here for succinctness.

In a practical implementation, the image processing apparatus 200 generates an interpolated picture (e.g., a first interpolated picture F') between pictures $F_{n-1}$, $F_n$, and generates another interpolated picture (e.g., a second interpolated picture F''') between pictures $F_n$, $F_{n+1}$, where the second interpolated picture F''' is the current interpolated picture and the first interpolated picture F' is the previous interpolated picture; in another embodiment, the first interpolated picture can be generated from an interpolation of a picture immediately after the second interpolated picture F''', and this still obeys the spirit of the present invention. Taking image pictures $F_{n-1}$, $F_n$, $F_{n+1}$ in FIG. 4 as an example, a moving direction of a foreground object is from right to left, while a moving direction of background is from left to right; it should be noted that this example of horizontal movement is for ease of explanation, however, the embodiment of this invention can also be employed to deal with a moving direction of an image in any direction, such as a vertical direction, a diagonal direction, etc.

Figure 5A:
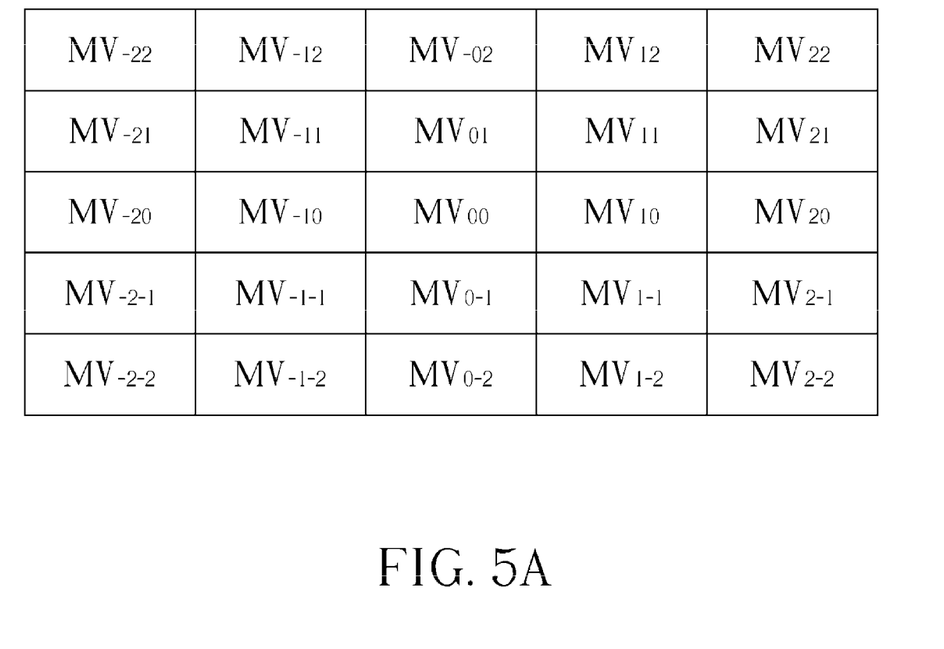
FIG. 5A is an exemplary diagram illustrating a plurality of values calculated by the calculating unit shown in FIG. 2 to represent a variation extent of motion vectors.

The following addresses the operation of the candidate vector generating module 215 generating two candidate vectors for each interpolated block of each interpolated picture (including F', F''', etc). The picture F' is the first interpolated picture and the picture F''' is the second interpolated picture. First of all, the image difference value generating module 2151 calculates motion vectors of all interpolated blocks according to the block matching algorithm, and then utilizes every calculated motion vector and a plurality of motion vectors of a plurality of neighboring blocks to calculate a chaos extent of the motion vectors to derive a data curve. For this embodiment, the data curve is a curve generated according to a cross section of the chaos extent of motion vectors in a horizontal direction of a certain interpolated block, where the data curve is representative of difference values of a plurality of successive blocks along one dimension, and the chaos extent indicates a motion vector variance of motion vectors, i.e., the data curve comprises a plurality of values which represent variance extent of different motion vectors along a specific direction. Please refer to FIG. 5A. FIG. 5A is an exemplary diagram of calculating values which indicate variance extents of motion vectors according to the present invention. If motion vectors of the first interpolated block and the neighboring blocks calculated by the block matching algorithm are $MV_{00}$ and $MV_{-2-2}$~$MV_{22}$, respectively, a motion vector variance value, MV_VAR, can be derived from these motion vectors by summing up one absolute value derived from the largest horizontal component minus the smallest horizontal component and another absolute value derived from the largest vertical component minus the smallest vertical component. Specifically, the calculation of the motion vector variance value MV_VAR can be shown using the following equation:

$$MV\_VAR = |MAX(MV_x) - MIN(MV_x)| + |MAX(MV_y) - MIN(MV_y)| \quad (1)$$

In the above equation (1), $MV_x$ and $MV_y$ represent a horizontal component (component along x axis) and a vertical component (component along y axis), respectively. It should be noted that a 5×5 block range is not meant to be a limitation to this invention, and the invention can also be implemented using an N×N block range or an N×M block range; in addition, the calculation of the motion vector variance value MV_VAR can also be implemented using following equation (2) or equation (3):

$$MV\_VAR = |MAX(MV_x) - MIN(MV_x)| + |MAX(MV_y) - MIN(MV_y)| + SAD \quad (2)$$

$$MV_{13}VAR = \alpha \times \{|MAX(MV_x) - MIN(MV_x)| + |MAX(MV_y) - MIN(MV_y)|\} + \beta \times SAD \quad (3)$$

In above equations (2) and (3), SAD represents a block matching difference value of the first interpolated block which is derived from the block matching algorithm, and parameters α and β are weighting factors. However, any equivalent variation capable of computing a value indicative of the variance extent of motion vectors still falls within the scope of this invention. From the description mentioned above, according to one of equation (1), equation (2) and equation (3), the calculating unit 205 performs calculation for different interpolated blocks one by one and then derives a first data curve CV as shown in FIG. 5B.

Figure 5B:
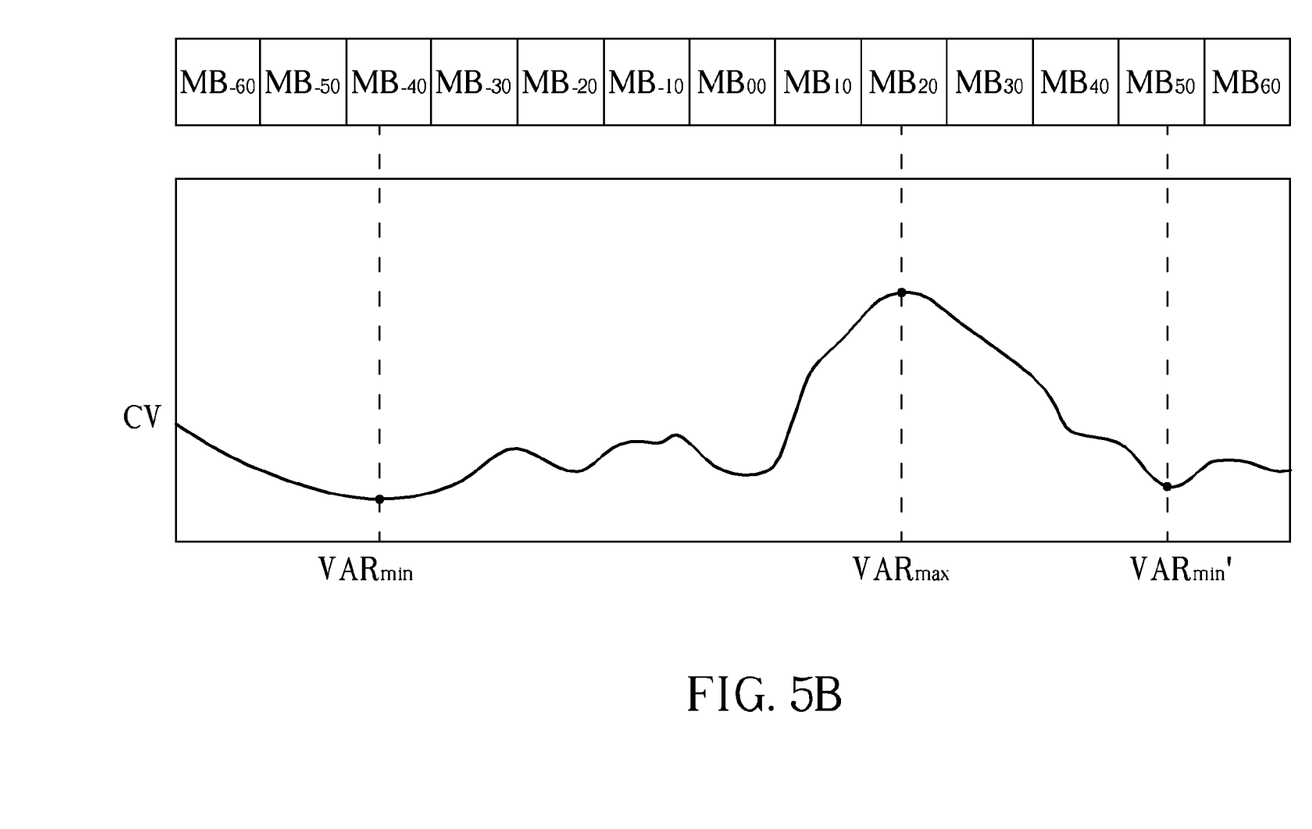
FIG. 5B is an exemplary diagram of a first data curve CV including multiple motion vector variation values.

FIG. 5B illustrates a first data curve CV including multiple motion vector variance values according to the present invention. $MB_{00}$ is a first interpolated block, and in FIG. 5B, the candidate vector determining module 2152 determines two candidate vectors $MV_1$, $MV_2$ of the first interpolated block $MB_{00}$. In the moving direction (e.g., a horizontal direction) of a background image or a foreground image, the candidate vector determining module 2152 picks a maximum value (e.g., $VAR_{max}$ in FIG. 5B) among all motion vector variance values corresponding to a plurality of blocks (e.g., six blocks $MB_{10} \sim MB_{60}$ at the left hand side of the first interpolated block and six block $MB_{-10} \sim MB_{-60}$ at the right hand side of the first interpolated block) distributed in a horizontal axis (i.e., the moving direction of the background image or the foreground image) passing through the first interpolated block, and then the candidate vector determining module 2152 picks two blocks corresponding to minimum motion vector variance values located at the left hand side and the right hand side of the found maximum value $VAR_{max}$, respectively. For instance, blocks $MB_{-40}$ and $MB_{50}$ are selected, and motion vectors of those two blocks $MB_{-40}$ and $MB_{50}$ derived by the block matching difference algorithm are utilized to serve as two candidate vectors $MV_1$, $MV_2$ of the first interpolated block. In other words, the candidate vector $MV_1$ of the first interpolated block corresponds to a minimum value $VAR_{min}$ at the left hand side of the maximum value $VAR_{max}$ of the first data curve CV, and the candidate vector $MV_1$ is also called the left motion vector of the first interpolated block $MB_{00}$; in addition, the candidate vector $MV_2$ of the first interpolated block corresponds to a minimum value $VAR_{min}$ at the right hand side of the maximum value $VAR_{max}$ of the first data curve CV, where the candidate vector $MV_2$ is also called the right motion vector of the first interpolated block. Furthermore, one of the candidate vectors $MV_1$ and $MV_2$ corresponds to a background motion vector, while the other corresponds to a foreground motion vector. This is because the motion vector variance value of the neighboring area of the covered or uncovered area will be very large, and the image block corresponding to the minimum motion vector variance value implies a foreground motion vector or a background motion vector, depending on the image block being located in the covered or uncovered area. Therefore, if the first interpolated block $MB_{00}$ is located in one of the covered areas and the uncovered areas, one of the candidate vectors $MV_1$ and $MV_2$ corresponds to the background motion vector while the other corresponds to the foreground motion vector. It should be noted that two candidate vectors (also called left motion vector and right motion vector) in this embodiment are one foreground motion vector and one background motion vector, respectively. In a practical implementation, two candidate vectors of a block might not be exactly a background vector and a foreground vector; however, the present invention can also be applied to such a scenario. From the operation described above, the candidate vector determining module 2152 is capable of calculating two candidate vectors $MV_1$ and $MV_2$ corresponding to each interpolated block of the first interpolated picture.

Figure 6A:
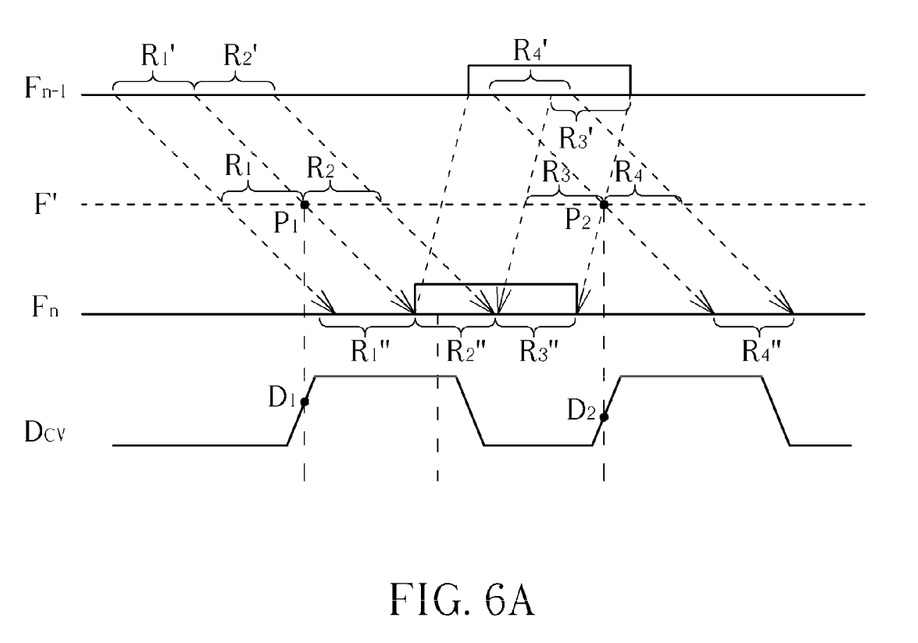
FIG. 6A is an exemplary diagram of a block matching difference data curve DCV derived through block matching calculation using candidate vector MV1 by the calculating unit shown in FIG. 2.

Please refer to FIG. 6A. FIG. 6A illustrates that the starting position determining module 2201 utilizes a left candidate vector $MV_1$ of each interpolated block of the first interpolated picture F' to perform block matching for calculating a plurality of block matching difference values of a plurality of interpolated blocks corresponding to the first interpolated picture F', where block matching difference values are shown using the curve $D_{CV}$ in FIG. 6A. The starting position determining module 2201 can determine a plurality of starting positions of the first interpolated picture F' according to a variation of the block matching difference values $D_{CV}$, and the starting position is at an edge of a covered area (or uncovered area) such that it can be utilized to determine an actual image area of the covered area (or uncovered area). In a practical implementation, the starting position determining module 2201 detects a variation of the value of the curve $D_{CV}$ ($D_{CV}$ includes a plurality of block matching difference values derived using the candidate vector MV1), and when the curve DCV has a monotonic value increment from left to right and a block matching difference value reaches a predetermined value TH, the starting position determining module 2201 will take the block corresponding to the block matching difference value reaching the predetermined value TH as a starting position of the first interpolated picture, where the starting position is also called a starting position of a covered area (or uncovered area). For example, referring to FIG. 6A, the starting position determining module 2201 determines that a starting position $P_1$ corresponding to a block matching difference value $D_1$ and a starting position $P_2$ corresponding to a block matching difference value $D_2$ are at edges of a covered area (or uncovered area). This is because, regarding the horizontal direction of image picture $F_{n-1}$, $F_n$, a foreground object is moving from right to left while a background image is moving from left to right; furthermore, the candidate vector $MV_1$ (which corresponds to a background motion vector) of a block within an image range $R_1$ is utilized to calculate a corresponding block matching difference value; that is, the calculation is based on the images within image ranges $R_1'$ and $R_1''$ of image pictures $F_{n-}$, $F_n$ (the exact image pictures before and after the first interpolated picture F'), respectively. Since images within image ranges $R_1'$ and $R_1''$ are the same/similar images, the calculated block matching difference values corresponding to the image range $R_1'$ are very small; when a block of the calculated image range is actually located in a covered area (e.g., a block within the image range $R_2$), a block matching difference value derived from the candidate vector $MV_1$ (which still corresponds to a back ground vector here) begins to rise due to the fact that no same/similar images can be found between image ranges $R_2'$, $R_2''$ of two sequential image pictures $F_{n-1}$, $F_n$, where the image range $R_2'$ is a background image, and the image range $R_2''$ is a foreground image. Regarding a block matching difference value corresponding to a starting position between the image ranges $R_1$ and $R_2$, a variation of the block matching difference value will increase abruptly from left to right and from small to large, and eventually exceeds the predetermined value TH; therefore, a starting position $P_1$ corresponding to a block matching difference value $D_1$ is found at an edge of a covered area (or uncovered area). Please note that, as the starting position $P_1$ is only known to be located either at the edge of a covered area or at the edge of an uncovered area at this moment, the starting position $P_1$ is not known to be located at the edge of a covered area until the calculating unit 205 performs further calculation.

In addition, when a candidate vector $MV_1$ (which corresponds to a foreground motion vector here) of a block within an image range $R_3$ is utilized to calculate a corresponding block matching difference value, images within image ranges $R_3'$ and $R_3''$ of the image pictures $F_{n-1}$ and $F_n$ will be used. Since the images within image ranges $R_3'$ and $R_3''$ are the same/similar foreground images, the block matching difference value corresponding to the image range $R_3$ is very small. However, when a block within the calculated image range is actually located in an uncovered area (e.g., a block within the image range $R_4$), the block matching difference value derived from the candidate vector $MV_1$ (which still corresponds to a foreground motion vector) will begin to rise. This is because no same/similar images can be found between image ranges $R_4'$, $R_4''$ of two sequential image pictures $F_{n-1}$, $F_n$, wherein the image range $R_4'$ is a foreground image, and the image range $R_4''$ is a background image. Regarding a block matching difference value corresponding to a starting position between the image ranges $R_3$ and $R_4$, a variation of the block matching difference value will increase abruptly from left to right and from small to large, and eventually exceeds the predetermined value TH; therefore, a starting position $P_2$ corresponding to a block matching difference value $D_2$ is at an edge of a covered area (or uncovered area). Please note that, as the starting position $P_2$ is only known to be located either at the edge of a covered area or at the edge of an uncovered area at this moment, the starting position P2 is not known to be located at the edge of the covered area until the calculating unit 205 performs further calculations.

Figure 6B:
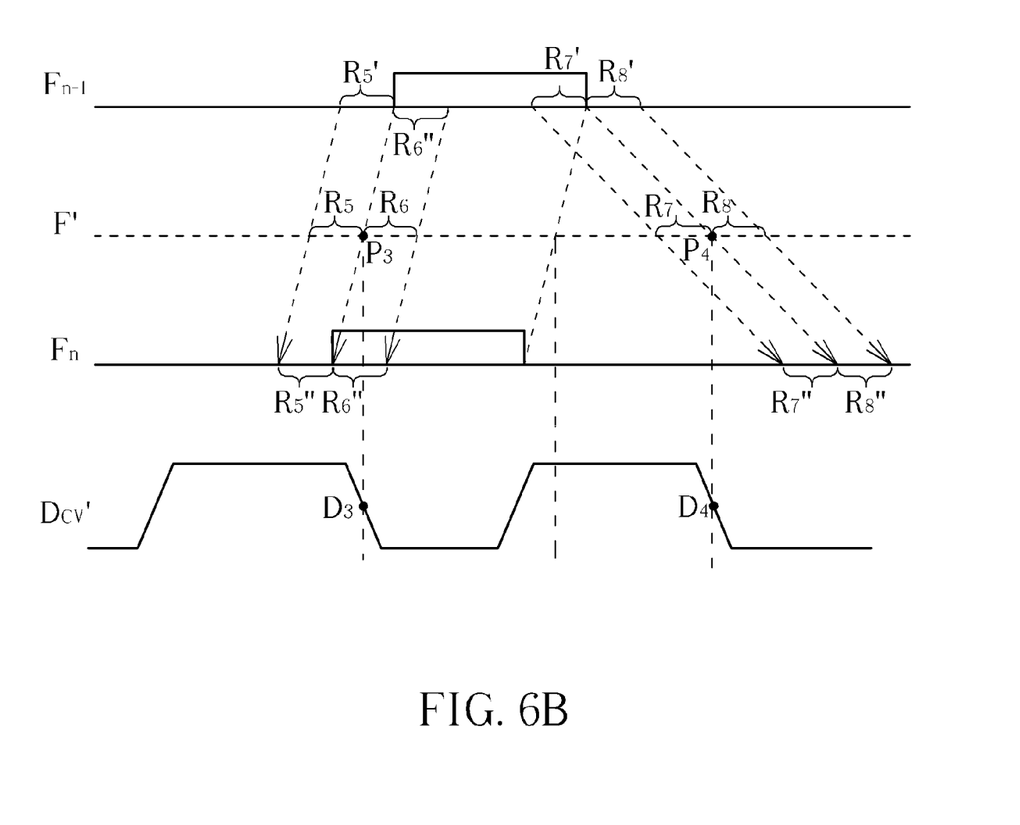
FIG. 6B is an exemplary diagram of a block matching difference data curve DCV' derived through block matching calculation using candidate vector MV2 by the calculating unit shown in FIG. 2.

Likewise, as shown in FIG. 6B, the starting position determining module 2201 can utilize a right candidate vector $MV_2$ of each interpolated block in the first interpolated picture F' to perform block matching calculation such that a plurality of block matching difference values corresponding to a plurality of interpolated blocks of the first interpolated picture can be derived, where the block matching difference values are illustrated using the curve $D_{CV}'$ in FIG. 6B. The starting position determining module 2201 can determine two starting positions $P_3$, $P_4$ of the first interpolated picture F' according to a variation of block matching difference values $D_{CV}'$, and the starting positions are at edges of a covered area (or uncovered area). Therefore, an actual image area of the covered area (or uncovered area) can be determined accordingly. In a practical implementation, the starting position determining module 2201 detects a value variation of the curve $D_{CV}'$ which includes a plurality of block matching difference values derived using the candidate vector $MV_2$, and when the curve $D_{CV}'$ has a monotonic value decrement from left to right and from large to small and a block matching difference value reaches a predetermined value TH', the starting position determining module 2201 will take the block corresponding to the block matching difference value reaching the predetermined value TH' as a starting position of the first interpolated picture, where the starting position is also called a starting position of a covered area (or uncovered area). For example, referring to FIG. 6B, the starting position determining module 2201 determines that a starting position $P_3$ corresponding to a block matching difference value $D_3$ and a starting position $P_4$ corresponding to a block matching difference value $D_4$ are at edges of a covered area (or uncovered area). This is because, when a block of a calculated image range is actually in a covered area (e.g., a block within the image range $R_5$), the candidate vector $MV_2$ (which still corresponds to foreground vector) of a block within the image range R5 is utilized to calculate a block matching difference value: that is, the calculation is based on images within image ranges $R_5'$, $R_5''$ of image picture $F_{n-1}$, $F_n$, respectively. Since images within image ranges $R_5''$ and $R_5''$ are different background images, the block difference value corresponding to the image range $R_5$ is very large. When a block within the calculated image range is located in a foreground object image range (e.g., a block within the image range $R_6$), a block matching difference value derived using the candidate vector $MV_2$ (which still corresponds to a foreground motion vector) becomes smaller due to the fact that images within image ranges $R_6'$ and $R_6''$ of two sequential image pictures $F_{n-1}$ and $F_n$ are the same foreground object image; therefore, regarding a block matching difference value $D_3$ corresponding to a starting position $P_3$ between image ranges $R_5$ and $R_6$, the block matching difference value will decrease abruptly from left to right and from large to small, and eventually become smaller than the predetermined value TH'. Therefore, the starting position $P_3$ corresponding to the block matching difference value $D_3$ is at an edge of a covered area (or uncovered area). Please note that, as the starting position $P_3$ is only known to be located either at the edge of a covered area or at the edge of an uncovered area at this moment, the starting position $P_3$ is not known to be located at the edge of the covered area until the calculating unit 205 performs further calculations.

In addition, when a block within the calculated image range is actually located in an uncovered area (e.g., a block within image range $R_7$), a candidate vector $MV_2$ (which corresponds to a background motion vector here) of a block within a image range $R_7$ is utilized to calculate a corresponding block matching difference value: that is, the calculation is based on images within image ranges $R_7'$ and $R_7''$ of image pictures $F_{n-1}$ and $F_n$, respectively. Since the images within image ranges $R_7'$ and $R_7''$ are different images (e.g., the image within image range $R_7'$ is a foreground object image while the image within image range $R_7''$ is a background image), the block matching difference value corresponding to the image range $R_7$ is very large. When a block within the calculated image range is actually located in a background image area (e.g., a block within image range $R_8$), the block matching difference value derived from candidate vector $MV_2$ (which still corresponds to a background motion vector) will begin to decrease. This is because images within image ranges $R_8'$ and $R_8''$ are the same/similar background images. Therefore, regarding a block matching difference value $D_4$ corresponding to a starting position $P_4$ between the image ranges $R_7$ and R8, the block matching difference value will decrease abruptly from left to right and from large to small, and eventually become smaller than the predetermined value TH'. A starting position $P_4$ corresponding to a block matching difference value $D_4$ is therefore at an edge of a covered area (or uncovered area). Please note that, as the starting position $P_4$ is only known to be located either at the edge of a covered area or at the edge of an uncovered area at this moment, the starting position $P_4$ is not known to be located at the edge of the covered area until the calculating unit 205 performs further calculations.

As described above, the starting position determining module 2201 performs block matching using the left and right candidate vectors $MV_1$ and $MV_2$ of each block in the first interpolated picture to derive the block matching difference values (e.g., the curve $D_{CV}$ shown in FIG. 6A and the curve $D_{CV}'$ shown in FIG. 6B); furthermore, the starting position determining module 2201 can also perform block matching using the left and right candidate vectors $MV_1'$ and $MV_2'$ of each block in the second interpolated picture to derive another plurality of block matching difference values and utilize the another block matching difference values to derive edge starting positions $P_1'$~$P_4'$ of covered areas (or uncovered areas). As the calculation procedure is similar to the one described before, further description is omitted here for brevity.

After the starting position determining module 2201 derives starting positions $P_1$~$P_4$ and $P_1'$~$P_4'$, the vector selecting module 2202 is capable of knowing where a covered area (or an uncovered area) of the first interpolated picture and the second interpolated picture is actually located according to the starting positions $P_1$~$P_4$ and $P_1'$~$P_4'$. For example, an image area which the vector selecting module 2202 finds between the right hand side of the starting position $P_1$ (or $P_1'$) and the left hand side of the starting position $P_3$ (or $P_3'$) is a covered area or an uncovered area of the first interpolated picture (or the second interpolated picture); an image area which the vector selecting module 2202 finds between the right hand side of the starting position $P_2$ (or $P_2'$) and the left hand side of the starting position $P_4$ (or $P_4'$) is a covered area or an uncovered area of the first interpolated picture (or the second interpolated picture). It is worth noting that the image area found here is not finally confirmed to be a covered area or an uncovered area at this point; that is, it can only be treated as either a covered area or an uncovered area, and a difference between candidate vectors $MV_1'$, $MV_2'$ of blocks within the found image area are required to further determine that the found image area is a covered area or an uncovered area. The operation will be detailed later. In addition, the larger a difference between candidate vectors $MV_1'$, $MV_2'$ becomes, the larger the actual image area of the covered area (or uncovered area) is, and vice versa.

Figure 7:
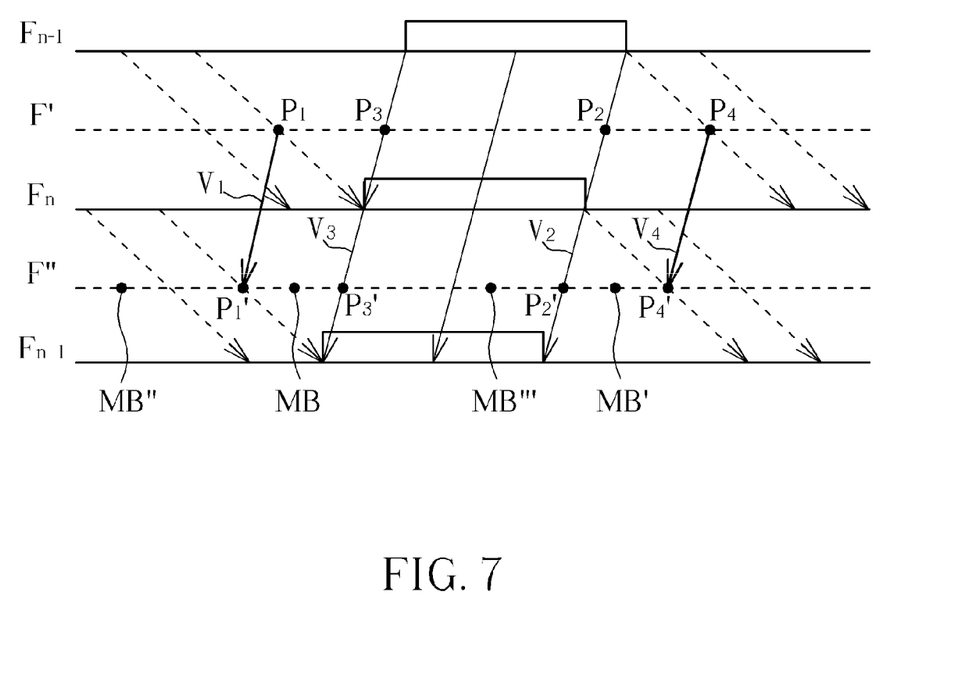
FIG. 7 is an exemplary diagram of starting positions P1~P4 and P1'~P4' determined by the calculating unit shown in FIG. 2.

In view of the above, after the starting position determining module 2201 derives starting positions $P_1$~$P_4$ and $P_1'$~$P_4'$, the vector selecting module 2202 can determine a target motion vector of a second interpolated block according to the starting position $P_1$~$P_4$ and $P_1'$~$P_4'$, where the target motion vector is utilized for determining/generating an actual image of the second interpolated block. Please refer to FIG. 7. FIG. 7 is an exemplary diagram of the starting positions $P_1$~$P_4$ and $P_1'$~$P_4'$ determined by the starting position determining module 2201. The vector selecting module 2202 respectively derives reference vectors $V_1$~$V_4$ according to $P_1$ and $P_1'$, $P_2$ and $P_2'$, $P_3$ and $P_3'$, $P_4$ and $P_4'$, and selects one of the candidate vectors $MV_1'$, $MV_2'$ of the second interpolated block according to at least one of the reference vectors $V_1$~$V_4$, wherein reference vectors $V_1$~$V_4$ correspond to or resemble the foreground motion vector. In a practical implementation, the vector selecting module 2202 compares one of the reference vectors $V_1$~$V_4$ with the candidate vectors $MV_1'$, $MV_2'$. When one of the reference vectors $V_1$~$V_4$ is similar to one of the candidate vectors $MV_1'$, $MV_2'$, the vector selecting module 2202 chooses the other one of the candidate vectors $MV_1'$, $MV_2'$ as the target motion vector. Therefore, if the second interpolated block is actually located in a covered area or an uncovered area, the determined target motion vector corresponds to or resembles a background motion vector. For example, if the second interpolated block is MB shown in FIG. 7, the candidate vector $MV_1'$ corresponds to or resembles a background motion vector and the candidate vector $MV_2'$ corresponds to or resembles a foreground motion vector. The vector selecting module 2202 therefore chooses the candidate vector $MV_1'$ which corresponds to or resembles the background motion vector as a target motion vector, and generates an image of the interpolated block MB according to the target motion vector. If the second interpolated block is MB' shown in FIG. 7, the candidate vector $MV_1'$ corresponds to or resembles a foreground motion vector and the candidate vector $MV_2'$ corresponds to or resembles a background motion vector. The vector selecting module 2202 therefore chooses the candidate vector $MV_2'$ which corresponds to or resembles the background motion vector as a target motion vector, and generates an image of the interpolated block MB' according to the target motion vector.

In addition, if the second interpolated block is not actually located in a covered area or an uncovered area, the vector selecting module 220 is still capable of determining a motion vector correctly. For example, if the second interpolated block is MB" shown in FIG. 7, and the candidate vectors $MV_1'$, $MV_2'$ both correspond to or resemble the background motion vector, the vector selecting module 2202 randomly picks one of the two candidate vectors $MV_1'$, $MV_2'$ as the target motion vector no matter whether the target motion vector of the interpolated block MB" is determined according to reference vectors $V_1$~$V_4$ or not. In fact, for the interpolated block MB", both candidate vectors are capable of generating a better interpolated image picture; in addition, if the second interpolated block is MB" shown in FIG. 7, the candidate vectors $MV_1'$, $MV_2'$ both correspond to or resemble the foreground motion vector, and the vector selecting module 2202 randomly picks one of the two candidate vectors MV1', MV2' as the target motion vector, where both candidate vectors are capable of generating a better interpolated image picture for the interpolated block MB".

In another embodiment, it is also feasible to choose one of the candidate vectors $MV_1'$, $MV_2'$ of the second interpolated block through one single reference vector to therefore determine the target motion vector, and this alternative design also falls within the scope of the present invention. It should be noted that, in this embodiment, if the target motion vector is merely determined through a reference vector $V_1$, the vector selecting module 2202 does not need to derive reference vectors $V_2$~$V_4$; however, the starting positions $P_1$~$P_4$ and $P_1'$~$P_4'$ still need to be derived for the ease of determining actual image areas of covered areas and uncovered areas. In other words, this embodiment of the present invention is capable of determining a target motion vector of a second interpolated through only determining two starting positions (e.g., one starting position pair selected from $P_1$ and $P_1'$, $P_2$ and $P_2'$, $P_3$ and $P_3'$, $P_4$ and $P_4'$).

The actual generating operation directed to generating the image of the second interpolated block is detailed as follows. First of all, since the exemplary embodiment of the present invention adopts a horizontally moving image for explanatary purposes, a motion vector from left to right is defined to be a positive motion vector; on the other hand, a motion vector with an opposite direction, i.e., from right to left, is defined to be a negative motion vector; however, this is not meant to be a limitation to the present invention, and any example using a two-dimensional plane with one specific direction as a positive direction and the opposite direction as a negative direction falls within the scope of the present invention. The calculating unit 205 determines whether the second interpolated block is located in a covered area or uncovered area according to a vector difference derived from one of the two candidate vectors of the second interpolated block minus the other candidate vector. Please refer to FIG. 7 again. Taking the interpolated block MB in FIG. 7 as an example, the image generating module 225 within the calculating block 205 derives a positive vector difference from the result of candidate vector $MV_1'$ minus the candidate vector $MV_2'$, and therefore determines that the interpolated block MB is located in a covered area. The image generating module 225 then takes an image of a block corresponding to one non-interpolated image picture $F_n$ immediately before the second interpolated picture to serve as an image picture of the interpolated block MB according to the determined target motion vector. In addition, regarding the interpolated block MB' in FIG. 7, the image generating module 225 derives a negative vector difference from the result of one candidate vector $MV_1'$ minus the other candidate vector $MV_2'$, and therefore determines that the interpolated block MB' is located in an uncovered area. The image generating module 225 then takes an image of a block corresponding to one non-interpolated image picture $F_{n+1}$ immediately next to the second interpolated picture to serve as an image picture of the interpolated block MB' according to the determined target motion vector. Briefly summarized, since the second interpolated block can be determined to be located in a covered area or an uncover area according to a vector difference of two candidate vectors of the second interpolated block, the image generating module 225 can utilize the determination result to select one image of either the non-interpolated picture immediately before the second interpolated picture or the non-interpolated picture immediately next to the second interpolated picture as the image of the second interpolated block.

In summary, for each block located in a covered area or an uncovered area of an interpolated picture, the image processing apparatus 200 in the exemplary embodiment of the present invention can correctly derive a target motion vector of the block, and perform image interpolation according to the target motion vector to acquire a better image, which greatly improves the image quality of the frame rate conversion result.

Those skilled in the art will readily observe that numerous modifications and alterations of the device and method may be made while retaining the teachings of the invention.

What is claimed is:

1. An image processing method for determining a motion vector of a interpolated block in a covered/uncovered area of an interpolated picture, the interpolated picture being composed of a plurality of blocks, the image processing method comprising:

determining a plurality of motion vector variances corresponding to original motion vectors of a plurality of successive blocks along one dimension in the interpolated picture according to the original motion vectors of the successive blocks, wherein the successive blocks include the interpolated block, and the original motion vectors of the successive blocks are results derived by respective block matching calculations;

determining first motion vectors and second motion vectors of the successive blocks according to the motion vector variances, wherein the first motion vector and the second motion vector of one of the successive blocks are the original motion vectors of two blocks located on both sides of a block having a maximum motion vector variance, and for each of the successive blocks, the step of determining the first motion vector and second motion vector comprises:

determining the block having the maximum motion vector variance according to the motion vector variances in;

determining the original motion vectors of two blocks located on both sides of the block having the maximum motion vector variance; and obtaining the first motion vector and the second motion vector respectively according to the original motion vectors;

determining a starting point of the interpolated block according to the first motion vectors and the second motion vectors of the successive blocks; and selecting one of the first motion vector and the second motion vector of the interpolated block as the motion vector of the interpolated block according to the starting point and a starting point in a previous interpolated picture;

wherein the covered/uncovered area is a background image area blocked by a foreground object in a picture and not blocked in another picture.

2. The image processing method of claim 1, wherein the step of determining the starting position of the interpolated block comprises:

utilizing one of the first motion vectors and the second motion vectors of successive blocks to derive a plurality of block matching difference values corresponding to the successive blocks; and determining the starting position according to a variation of the block matching difference values.

3. The image processing method of claim 1, wherein the step of selecting one of the first motion vector and the second motion vector of the interpolated block as the motion vector of the interpolated block comprises:

referring to the starting position of the interpolated picture and the starting position of the previous interpolated picture to generate a reference vector;

comparing the reference vector with the first motion vector and the second motion vector of the interpolated block; and when the reference vector is similar to one of the first motion vector and the second motion vector of the interpolated block, selecting the other of the first motion vector and the second motion vector as the motion vector of the interpolated block.

4. An image processing method for determining a motion vector of a interpolated block in a covered/uncovered area of an interpolated picture, the interpolated picture being composed of a plurality of blocks, the image processing method comprising:

determining first candidate vectors and second candidate vectors of successive blocks within the interpolated picture and first candidate vectors and second candidate vectors for a corresponding successive blocks within a previous interpolated picture, respectively, wherein the successive blocks include the interpolated block, the first and second candidate vectors of the successive blocks being results derived by respective block matching calculations, and for each of the successive blocks, the step of determining the first candidate vector and second candidate vector comprises:

determining a block having a maximum motion vector variance according to a plurality of motion vector variances corresponding to a plurality of successive blocks;

determining original motion vectors of two blocks located on both sides of the block having the maximum motion vector variance; and obtaining the first motion vector and the second motion vector respectively according to the original motion vectors of the two blocks;

determining a starting position of the covered/uncovered areas within the interpolated picture and a corresponding starting position of a covered/uncovered area within the previous interpolated picture, respectively by utilizing one of the first candidate vectors and the second candidate vectors of the interpolated picture and the previous interpolated picture; and selecting one of the first candidate vector and the second candidate vector of the interpolated block as the motion vector of the interpolated block according to the starting position of the interpolated picture and the corresponding starting position of the previous interpolated picture;

wherein the covered/uncovered area is a background image area blocked by a foreground object in a picture and not blocked in another picture.

5. The image processing method of claim 4, wherein the step of determining one of the first candidate vector and the second candidate vector of the interpolated block as a motion vector of the interpolated block comprises:

utilizing one of the first candidate vectors and the second candidate vectors of the interpolated picture and the previous interpolated picture to derive a plurality of block matching difference values corresponding to the interpolated picture and a plurality of block matching difference values corresponding to the previous interpolated picture; and determining the starting position of the interpolated picture and the starting position of the previous interpolated picture according to a variation of the block matching difference values of the interpolated picture and a variation of the block matching difference values of the previous interpolated picture.

6. The image processing method of claim 4, wherein the step of determining one of the first candidate vector and the second candidate vector of the interpolated block as a motion vector of the interpolated block comprises:
referring to the starting position of the interpolated picture and the starting position of the previous interpolated picture to generate a reference vector;
comparing the reference vector with the first motion vector and the second motion vector of the block within the covered/uncovered area of the interpolated picture; and
when the reference vector is similar to one of the first motion vector and the second motion vector, selecting the other of the first motion vector and the second motion vector as the motion vector of the block.

7. The image processing method of claim 4, wherein the step of determining first candidate vectors and second candidate vectors for a successive blocks within the interpolated picture comprises:
calculating a plurality of motion vectors of the successive blocks within the interpolated picture according to a block matching algorithm;
calculating a data curve according to the motion vectors of the successive blocks within the interpolated picture, values of the data curve indicate the motion vector variances corresponding to the successive blocks respectively; and
determining the first candidate vectors and the second candidate vectors of the successive blocks within the interpolated picture, wherein the first candidate vectors correspond to a minimum value located at a side of a maximum value of the data curve and the second candidate vectors correspond to a minimum value located at the other side of the maximum value of the data curve.

8. The image processing method of claim 4, further comprising:
determining one of a previous original picture and a next original picture to perform the image interpolation according to a difference between the first candidate vector and the second candidate vector and the motion vector of the block within the interpolated picture.

9. An image processing apparatus for determining a motion vector of a interpolated block in a covered/uncovered area of an interpolated picture, the interpolated picture being composed of a plurality of blocks, the image processing apparatus comprising:
a storage unit, for storing at least a previous original picture and a next original picture of the interpolated picture and a starting position of a previous interpolated picture; and
a calculating unit, coupled to the storage unit, comprising:
a candidate vector generating module, for determining a plurality of first candidate vectors and a plurality of second candidate vectors of successive blocks in the interpolated picture, and the first and second candidate vectors of the successive blocks are results derived by respective block matching calculations; and
a motion vector determining module, coupled to the candidate vector generating module, for determining the motion vector of the interpolated block according to the first candidate vectors and the second candidate vectors of the successive blocks in the interpolated picture and the starting position of the previous interpolated picture;
wherein the covered/uncovered area is a background image area blocked by a foreground object in a picture and not blocked in another picture; and the candidate vector generating module comprises:
an image difference generating module, for determining an image difference value of the interpolated block according to a plurality of original motion vectors of a plurality of neighboring blocks of the interpolated block; and
a candidate vector determining module, coupled to the image difference generating module, for determining a plurality of first candidate vectors and a plurality of second candidate vectors of the successive blocks according to a plurality of motion vector variances corresponding to the successive blocks, wherein for each block the candidate vector determining module is utilized for determining a block having a maximum motion vector variance according to the motion vector variances corresponding to the successive blocks, determining original motion vectors of two blocks located on both sides of the block having the maximum motion vector variance, and obtaining a first candidate vector and a second candidate vector respectively according to the original motion vectors of the two blocks.

10. The image processing apparatus of claim 9, wherein the motion vector determining module comprises:
a starting position determining module, utilizing one of the first candidate vectors and the second candidate vectors of the successive blocks of the interpolated picture to calculate a plurality of block matching difference values corresponding to the successive blocks and determining a starting position of the interpolated picture according to a variation of the block matching difference values; and
a vector selecting module, coupled to the starting position determining module, for generating a reference vector according to the starting position of the interpolated picture and the starting position of the previous interpolated picture, comparing the reference vector with a first candidate vector and a second candidate vector of the interpolated block, and selecting one of the first candidate vector and the second candidate vector according to which is less similar to the reference vector to serve as the motion vector of the interpolated block.

* * * * *